United States Patent
Colosimo et al.

(10) Patent No.: US 8,307,637 B2
(45) Date of Patent: *Nov. 13, 2012

(54) DEVICE FOR PURIFYING EXHAUST GASES OF A VEHICLE BY SELECTIVE CATALYTIC REDUCTION INCLUDING A HEATED PIPING

(75) Inventors: Franco Colosimo, San Mauro Torinese (IT); Mario Zasa, Nichelino (IT); Simone Cavanna, Cercenasco (IT)

(73) Assignee: Dayco Fluid Technologies S.p.A., Turin (IT)

( * ) Notice: Subject to any disclaimer, the term of this patent is extended or adjusted under 35 U.S.C. 154(b) by 782 days.

This patent is subject to a terminal disclaimer.

(21) Appl. No.: 12/067,029

(22) PCT Filed: Sep. 16, 2005

(86) PCT No.: PCT/IT2005/000532
§ 371 (c)(1),
(2), (4) Date: Oct. 21, 2008

(87) PCT Pub. No.: WO2007/032035
PCT Pub. Date: Mar. 22, 2007

(65) Prior Publication Data
US 2009/0049820 A1 Feb. 26, 2009

(51) Int. Cl.
*F01N 3/00* (2006.01)
*F01N 3/10* (2006.01)
*F01N 5/02* (2006.01)
*F24H 1/10* (2006.01)
*H05B 3/40* (2006.01)
*H05B 3/78* (2006.01)

(52) U.S. Cl. ............. 60/295; 60/301; 60/320; 392/478; 392/485; 392/489
(58) Field of Classification Search .................. 60/286, 60/295, 301, 303, 320; 392/472, 478–480, 392/485, 487–489
See application file for complete search history.

(56) References Cited

U.S. PATENT DOCUMENTS

| 3,378,673 A | 4/1968 | Hopper |
| 3,658,976 A | 4/1972 | Slade |
| 4,038,519 A | 7/1977 | Foucras et al. |
| 4,214,147 A | 7/1980 | Kraver |

(Continued)

FOREIGN PATENT DOCUMENTS

DE  4432576  3/1996

(Continued)

OTHER PUBLICATIONS

Hofmann et al., English Abstract of DE 19843317 A1, Mar. 23, 2000.*

(Continued)

Primary Examiner — Binh Q Tran
Assistant Examiner — Audrey K Bradley
(74) Attorney, Agent, or Firm — Sheridan Ross P.C.

(57) ABSTRACT

A device for purifying exhaust gases of a vehicle by selective catalytic reduction including a heated piping. The heated piping comprises a fluid conveying pipe including a thermoplastic elastomer, a heating element arranged inside the conveying pipe, and an anti-abrasive layer. Preferably, the conveying pipe is made of a polyolefinic matrix based thermoplastic elastomer in which it is intimately dispersed a dynamically vulcanized and EPDM based elastomeric phase.

10 Claims, 3 Drawing Sheets

U.S. PATENT DOCUMENTS

| | | | |
|---|---|---|---|
| 4,502,929 | A | 3/1985 | Stewart et al. |
| 4,520,164 | A | 5/1985 | Liu |
| 4,851,468 | A | 7/1989 | Hazelton et al. |
| 5,100,947 | A | 3/1992 | Puydak et al. |
| 5,322,901 | A | 6/1994 | Kato |
| 5,381,511 | A | 1/1995 | Bahar et al. |
| 5,457,159 | A | 10/1995 | Fassina et al. |
| 5,791,377 | A | 8/1998 | LaRochelle et al. |
| 5,884,475 | A * | 3/1999 | Hofmann et al. ............... 60/274 |
| 6,130,404 | A | 10/2000 | Campagna et al. |
| 6,277,916 | B1 | 8/2001 | Terbrueggen et al. |
| 6,442,932 | B1 * | 9/2002 | Hofmann et al. ............... 60/274 |
| 6,890,990 | B2 | 5/2005 | Cai et al. |
| 7,435,770 | B2 | 10/2008 | Hattori et al. |
| 7,728,056 | B2 | 6/2010 | Kuvshinnikova et al. |
| 7,853,132 | B2 | 12/2010 | Muller |
| 2003/0232207 | A1 * | 12/2003 | Thullen et al. ............. 428/476.3 |
| 2004/0112453 | A1 | 6/2004 | Bremard et al. |
| 2005/0049345 | A1 * | 3/2005 | Greiner et al. ................ 524/404 |
| 2005/0063689 | A1 * | 3/2005 | Auber ........................... 392/468 |
| 2006/0101811 | A1 * | 5/2006 | Linna et al. .................... 60/286 |
| 2008/0041841 | A1 * | 2/2008 | Tanaka et al. ................. 219/535 |
| 2009/0270545 | A1 | 10/2009 | Sahnoune et al. |
| 2010/0126986 | A1 | 5/2010 | Gunzing et al. |

FOREIGN PATENT DOCUMENTS

| | | |
|---|---|---|
| DE | 19843317 A1 * | 3/2000 |
| DE | 202005004602 | 7/2005 |
| EP | 0312204 | 4/1989 |
| EP | 1329660 | 7/2003 |
| GB | 2398110 | 8/2004 |
| WO | WO 2004/029493 | 4/2004 |
| WO | WO 2005080850 A1 * | 9/2005 |
| WO | WO 2006097765 A1 * | 9/2006 |

OTHER PUBLICATIONS

International Search Report prepared by the European Patent Office on Dec. 23, 2005 for International Application No. PCT/IT2005/000532.

International Search Report prepared by the European Patent Office on May 31, 2006 for International Application No. PCT/IT2005/00530.

* cited by examiner

DEVICE FOR PURIFYING EXHAUST GASES OF A VEHICLE BY SELECTIVE CATALYTIC REDUCTION INCLUDING A HEATED PIPING

CROSS REFERENCE TO RELATED APPLICATION

This application is a national stage application under 35 U.S.C. 371 of PCT Application No. PCT/IT2005/000532 having an international filing date of 16 Sep. 2005, which designated the United States, the entire disclosure of each of which is hereby incorporated herein by reference.

TECHNICAL FIELD

The present invention relates to a device for purifying exhaust gases of a vehicle by selective catalytic reduction including a heated piping.

BACKGROUND ART

To comply with the new anti-pollution standards, which impose more restrictive exhaust gas emission limits with respect to the existent, it is known the use of the so-called purification system by selective catalytic reduction, also known under the acronymic SCR ("Selective Catalytic Reduction") of the exhaust-gases of a vehicle. Such system is adopted, in particular, for reducing the emission into the atmosphere of nitrogen oxides.

Preferably, the SCR system is used in light-duty and heavy-duty vehicles.

The SCR system consists of injecting by compressed air at the catalyser inlet an aqueous solution of urea or equivalent product capable of reacting with the nitrogen oxides. Generally, it is preferred an aqueous solution of 32.5% of urea, for example the solution commonly marketed by Basf under the name AdBlue. The catalyser is arranged at the exhaust gas muffler and, inside it, the introduced urea reacts with the nitrogen oxides, also commonly called $NO_X$, eliminating them from the atmospheric emissions.

The aqueous urea solution is generally contained in a tank from where it is taken to be injected into the catalyser, after being mixed to compressed air, according to times and modes defined by an electronic control unit which accounts for various parameters such as for example temperature, humidity, engine operation and number of revolutions.

A known problem of the SCR system is that during the parking of vehicles at temperatures lower than −12° C. the urea solution freezes. For this reason when the engine is ignited after parking, the pipings containing the urea solution are immediately heated up by passage of electrical current.

For example, it is felt the need to reach a temperature of at least +5° C. for the urea solution at least ten minutes after the engine is ignited, with the SCR system initially placed at an ambient temperature of −35° C.

Furthermore, the pipings which convey the aqueous urea solution must allow the passage of fluid in the working temperature range, that is from −40° C. to 80° C., must be flexible and must ensure that, in −40° C. conditions, the aqueous urea solution does not freeze in any part in all flow rate conditions, that is from 0 to 5.5 l/h.

For heating up the aqueous solution there are therefore generally used electrically heated pipings and pipe fittings.

For example, it is known the use of heated pipings comprising TEFLON® fluid conveying pipes, with an electrical resistance externally wound on a polyethylene heat-shrink sheath which also has the function of electrical insulation and is further covered by a corrugated polyamide tube.

Such solution however does not allow to obtain a sufficiently rapid defrosting of the aqueous solution to respond to the aforementioned requirements due to the fact that the TEFLON® does not allow sufficient conduction of heat to warm up the inside of the pipe. The TEFLON® pipes also present problems in use in coupling of couplings and are also very costly.

Such pipes also present the defect of presenting a high dissipation of the heat produced by the electrical resistor. The generated heat is indeed only partially supplied to the mass of solid solution to be heated because a portion is dispersed between the heater and the external environment at −35° C.

Furthermore, the known solutions described above are not very satisfactory, because they cannot always achieve a need to eliminate "plugs" of solid solution which are formed inside the connections of the heated pipings.

Indeed, the heat generated by the electrical resistors spirally wound on the pipings cannot always sufficiently warm up the solidified part of solution inside the pipe connections.

DISCLOSURE OF INVENTION

It is the object of the present invention to make a device for purifying exhaust gases of a vehicle by selective catalytic reduction including a heated piping, which allows to simply and cost-effectively solve the aforementioned problems.

According to the present invention it is made a device for purifying exhaust gases of a vehicle by selective catalytic reduction including a heated piping according to claim 1.

BRIEF DESCRIPTION OF THE DRAWINGS

The invention will now be described with reference to the accompanying drawings illustrating a non-limitative embodiment example, in which.

BEST MODE FOR CARRYING OUT THE INVENTION

Figure 2:
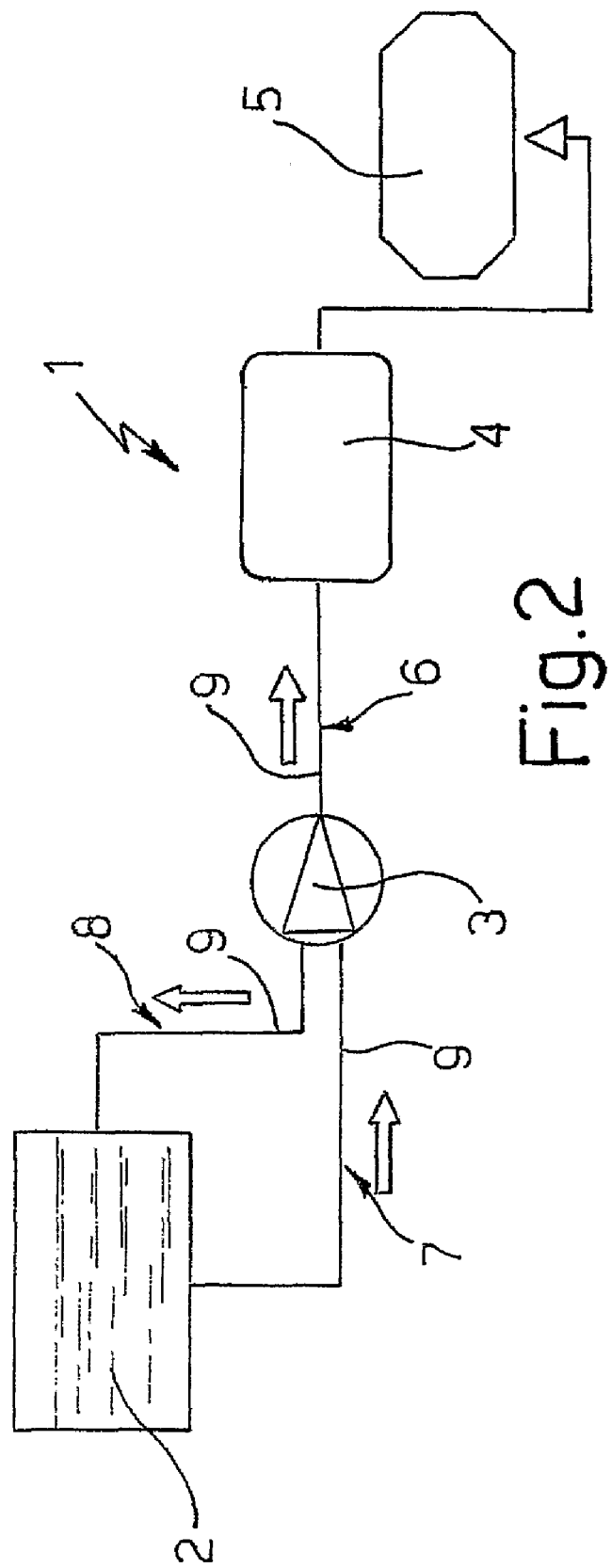
FIG. 2 is a diagram of a SCR system.
Figure 3:
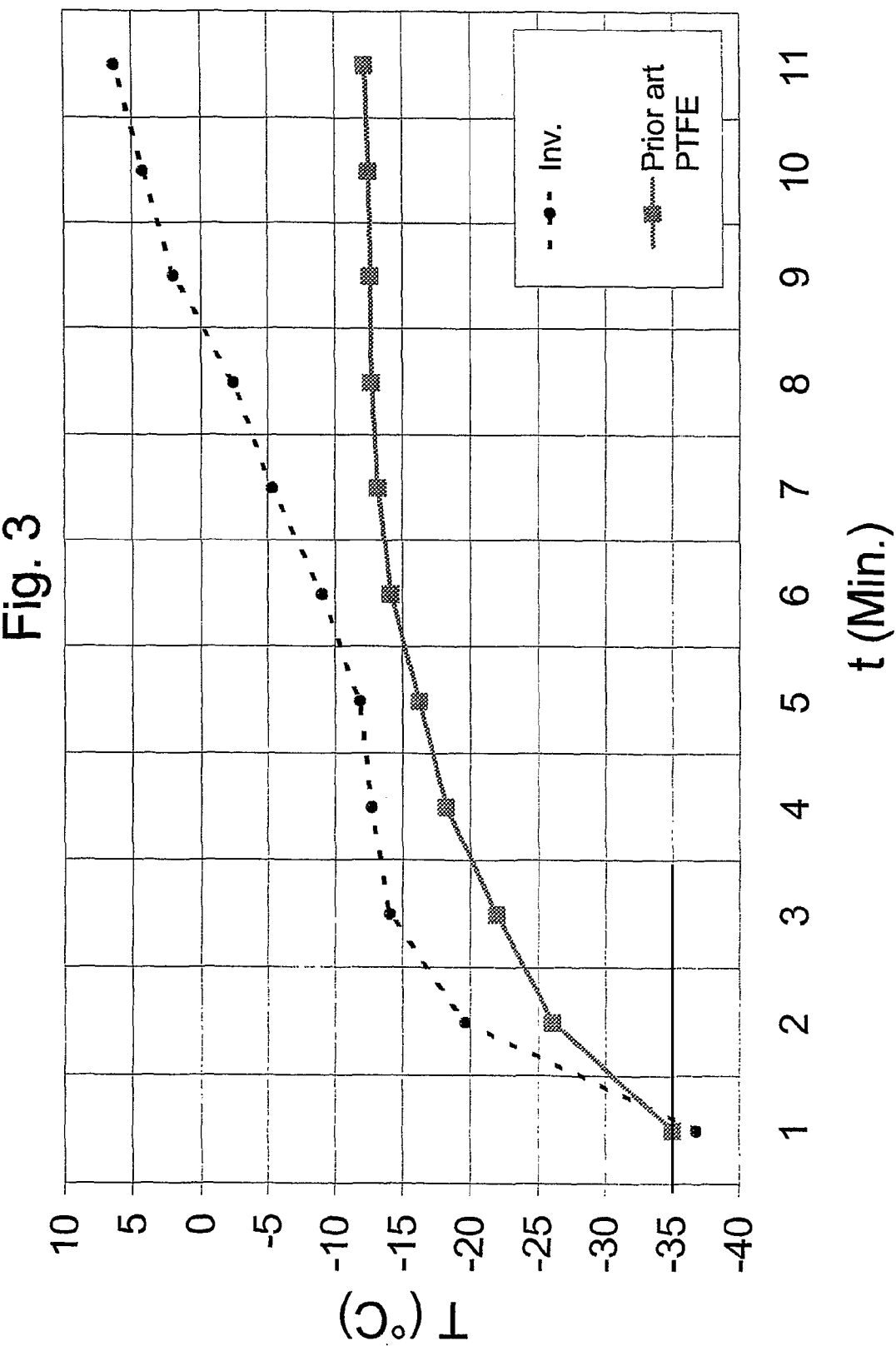
FIG. 3 a graph showing the temperature value pattern in time of an aqueous solution of 32.5% of urea contained in a piping made according to the invention compared with a piping made according to the known art.

In FIG. 2, numeral 1 indicates a purification device or SCR system (schematically shown) of a motor vehicle, comprising a tank 2 containing a 35% solution of urea, a pump module 3, and a metering module 4, which mixes the urea solution with compressed air to send it into a catalyser 5 (schematically shown) of the motor vehicle itself.

The pump module 3 is connected to the metering module 4 via a delivery line 6, and to the tank 2 via a suction line 7 and a recirculation line 8. The lines 6-8 comprise respective pipings 9, which are heatable by electrical current and connected to the other components in the system 1 via pipe fittings.

According to the present invention, the piping 1 comprises a heating element 21 consisting of an electrical resistor arranged inside a fluid conveying pipe 22, which comprises a thermoplastic elastomer.

The conveying pipe 22 is covered by an anti-abrasive layer 23.

Such configuration presents the advantage of defrosting the aqueous solution in the aforementioned range in the least time. The pipe configuration according to the present invention indeed ensures a lower waste of electrical power decreasing the thermal dispersion towards the outside of the piping exploiting the insulating power of the solid urea solution itself which is an insulator itself.

The piping also allows to defrost the iced section also because the resistor is either in direct contact or very close to the piping connection.

In particular, the conveying pipe 22 comprises a thermoplastic elastomer also known under the acronym TPE. For thermoplastic elastomer it is meant a polymeric material which behaves like an elastomer, but when heated can be worked like a thermoplastic.

Preferably, it is used a thermoplastic elastomer with polyolefinic matrix base in which is intimately dispersed a dynamically vulcanised elastomeric phase.

More preferably, the polyolefinic matrix is a polypropylene and the elastomeric phase is EPDM.

Even more preferably, the thermoplastic elastomer is a Forprene®.

Preferably, the conveying pipe 22 consists of a thermoplastic elastomer made thermally conductive by integration of appropriate fillers in the compound.

Preferably, such fillers are metallic fillers.

Advantageously, the thermal conductivity of the thermoplastic elastomer is comprised from 1.2 W/mK to 40 W/mK according to the ASTM E1461 test standards. More advantageously, thermal conductivity is approximately 20 W/mK.

Preferably, the pipe presents an internal diameter larger than 5 mm.

Preferably, the thickness of the conveying pipe 22 is comprised from 2 to 4 mm.

The heating element 21 is preferably a wire electrical resistor wound around the conveying pipe 22.

Figure 1:
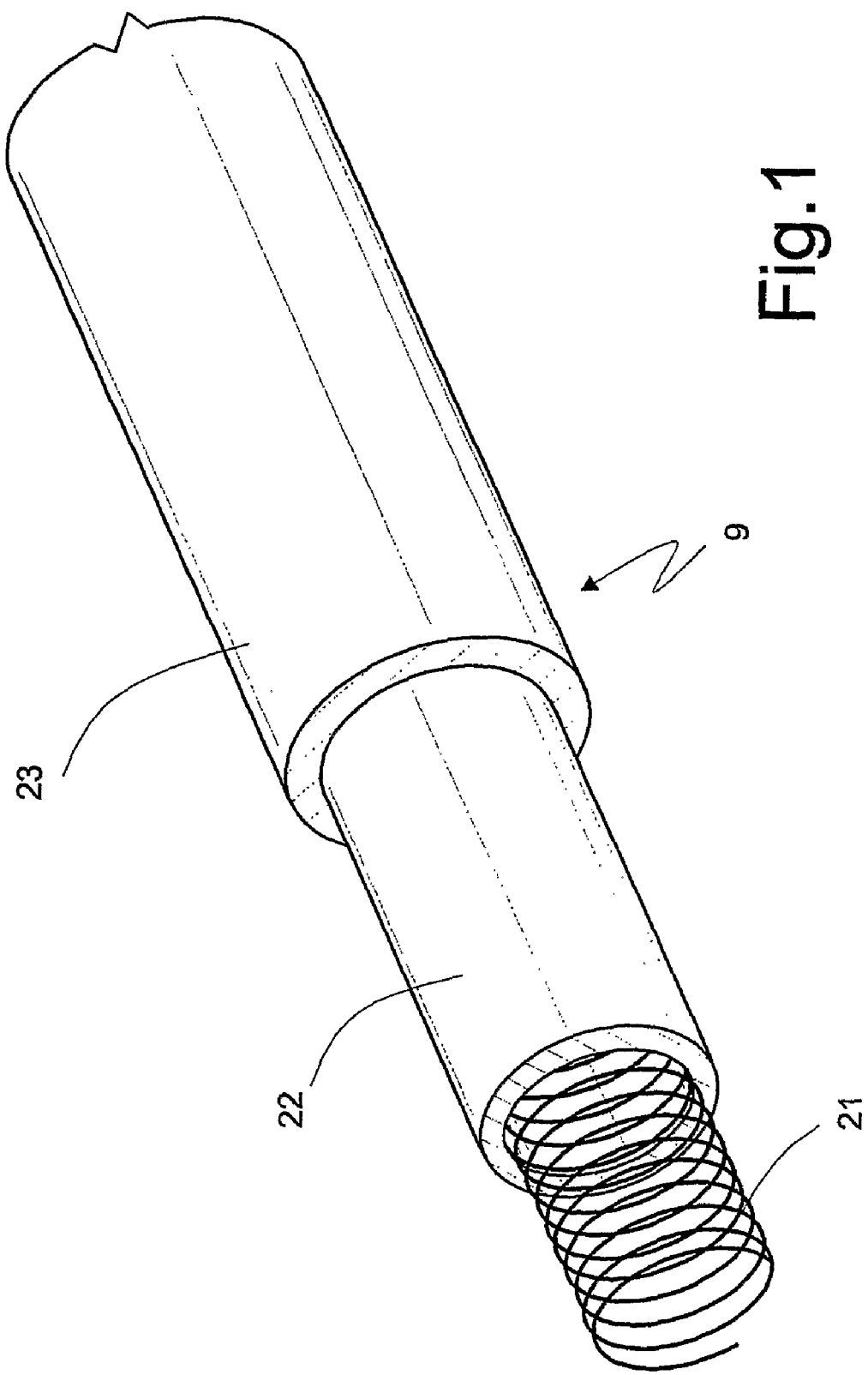
FIG. 1 shows, cross-sectionally and schematically, a preferred embodiment of a heatable piping of a SCR system according to the present invention.

Even more preferably, it is used as a heating wire, for example, of the type marketed under the code NiCr8020 by Shanghai Anhing Alloy Material Co. Ltd. The electrical resistor can be bipolar or monopolar, preferably bipolar. As also shown in FIG. 1, the heating element 21 is placed in and exposed within the hollow interior of the conveying pipe 22 in a helical configuration.

The geometries and the dimensions of the electrical resistive elements depend on the features required by specific use and moreover depend on the dimensions of the components in the whole piping.

The anti-abrasive layer 23 is preferably made of a corrugated tube 23. Preferably, the corrugated tube 23 is made of polyamide 12. Alternatively, the anti-abrasive layer 23 is a spiral sheath or spiral tape of appropriate dimensions to maintain the designed curve radius, preferably made of polyamide 6 or 12. Even more preferably, the spiral sheath is made of polyamide 12 because it has a better chemical resistance.

Optionally, an insulating layer can be used between the conveying pipe 21 and the anti-abrasive layer 23.

The insulating layer is preferably made of polyurethane. More preferably, it is made of open or closed cell expanded polyurethane. More preferably, it is made of closed cell expanded polyurethane.

Preferably, the insulating layer presents a thickness higher than 5 nm and an internal diameter depending on the diameter of the conveying pipe 2.

A piping 9 manufactured according to the structure previously described is capable of reaching the objective of defrosting the aqueous urea solution in a shorter time with respect to the known pipings.

It is finally apparent that numerous changes can be implemented to the piping herein described and illustrated, in particular to the percentage ratio of the chemical components forming the various layers and to the relative thickness of the layers, as well as to the number of layers themselves, for example, the heat-shrink sheath may not be present, without departing from the protective scope of the present invention nevertheless.

In the above description, there are apparent the advantages of a piping made according to the present invention, in particular by means of such piping it is possible to heat a liquid in a shorter time with respect to the known pipings and at the same time to have a sufficiently flexible piping and at a limited cost.

The invention will now be described through examples, however it is not limited to them.

EXAMPLE 1

Table 1 shows an example of a piping 9 made according to the present invention, while table 2 shows an example of a comparison piping.

TABLE 1

| Example according to the invention | |
|---|---|
| Conveying pipe 22 | TPE tube, 13*7.5 mm, length 1500 mm |
| Heating element 21 | Bipolar NiCr8020 wire, 6.3 Ω, PA12 ® insulated |
| Anti-abrasive layer 23 | Corrugated polyamide tube 12 |

TABLE 2

| Comparative example | |
|---|---|
| Conveying pipe | TEFLON ® tube 8 × 6 mm, length 1500 mm |
| Heating element | Bipolar NiCr8020 wire, 6.3 Ω, TEFLON ® insulated |
| Sealing element | Heat-shrink polyethylene sheath |
| Anti-abrasive layer | Corrugated tube |

Graph 1 shows the temperature value pattern in time of a 32% aqueous urea solution contained in a piping according to the present invention whose composition is described in table 1 and of the piping used as comparison whose composition is shown in table 2.

Such temperature is measured by introducing in the pipings, inside which is introduced the aqueous urea solution, into a sealed climatic cell where a temperature of −35° C. is stabilised. In such a way, the solution contained inside is frozen taking it also to a temperature of −35° C.

After stabilising the temperature, the electrical connections of the electrical resistor wound on the conveying pipe are connected to an electrical power supply under a voltage of 24V, and therefore a current of 3.8 A is circulated.

A series of thermocouples placed inside the piping allow to determine the temperature of the aqueous solution.

It is apparent that the use of a piping made according to the present invention allows to raise the temperature of the aqueous urea solution faster and more efficiently than that occurs using a piping comprising a pipe made of PTFE.

What is claimed is:

1. A device for purifying exhaust gases of a motor vehicle having an engine, comprising (i) a tank containing a urea solution, (ii) a pump module, (iii) a catalyser; and (iv) a single conveying pipe having a hollow interior for conveying said urea solution, said conveying pipe including (a) a heating element arranged in a helical configuration, mounted within and contacting an interior surface of said conveying pipe, the heating element being exposed within the hollow interior (b) said conveying pipe being made of a polyolefinic matrix based thermoplastic elastomer comprising polypropylene in which is intimately dispersed an elastonieric phase, and (c) wherein the conveying pipe is heated to attain a temperature of at least +5° C. for the urea solution within 10 minutes after the engine is ignited when the device has an initial temperature as cold as −35° C.

2. A device according to claim 1, wherein said elastomeric phase is EPDM.

3. A device according to claim 1, wherein said heating element includes a wire resistor.

4. A device according to claim 1, wherein said thermoplastic elastomer comprises electric conductors added before forming to he made thermally conductive.

5. A device according to claim 4, wherein said electric conductors are metallic fillers.

6. A device according to claim 4, wherein said thermoplastic elastomer has a thermal conductivity higher than 1.2 W/mK.

7. A device according to claim 1, wherein the device further comprises an anti-abrasive layer over said conveying pipe.

8. A device according to claim 7, wherein said anti-abrasive layer is a corrugated tube.

9. A device according to claim 8, wherein said anti-abrasive layer is made of polyamide.

10. A method of purifying exhaust gases of a motor vehicle having an engine, comprising:
providing: (i) a tank containing a urea solution, (ii) a pump module, (iii) a catalyser; and (iv) a single conveying pipe having a hollow interior for conveying said urea solution, wherein said conveying pipe is made of a polyolefinic matrix based thermoplastic elastomer comprising polypropylene in which is intimately dispersed an elastomeric phase;
mounting a heating element within and contacting an interior surface of said conveying pipe, said heating element arranged in a helical configuration and exposed within the hollow interior; and
heating the conveying pipe to attain a temperature of at least +5° C. for the urea solution within 10 minutes after the engine is ignited when the device has an initial temperature as cold as −35° C.

* * * * *

UNITED STATES PATENT AND TRADEMARK OFFICE
CERTIFICATE OF CORRECTION

PATENT NO.          : 8,307,637 B2
APPLICATION NO.     : 12/067029
DATED               : November 13, 2012
INVENTOR(S)         : Colosimo et al.

It is certified that error appears in the above-identified patent and that said Letters Patent is hereby corrected as shown below:

At Column 5, line 12 of claim 1, please replace the word "elastonieric" with the word "elastomeric".

At Column 5, line 22 of claim 4, please replace the word "he" with the word "be".

Signed and Sealed this
Twelfth Day of February, 2013

Teresa Stanek Rea
*Acting Director of the United States Patent and Trademark Office*